Figure 1:
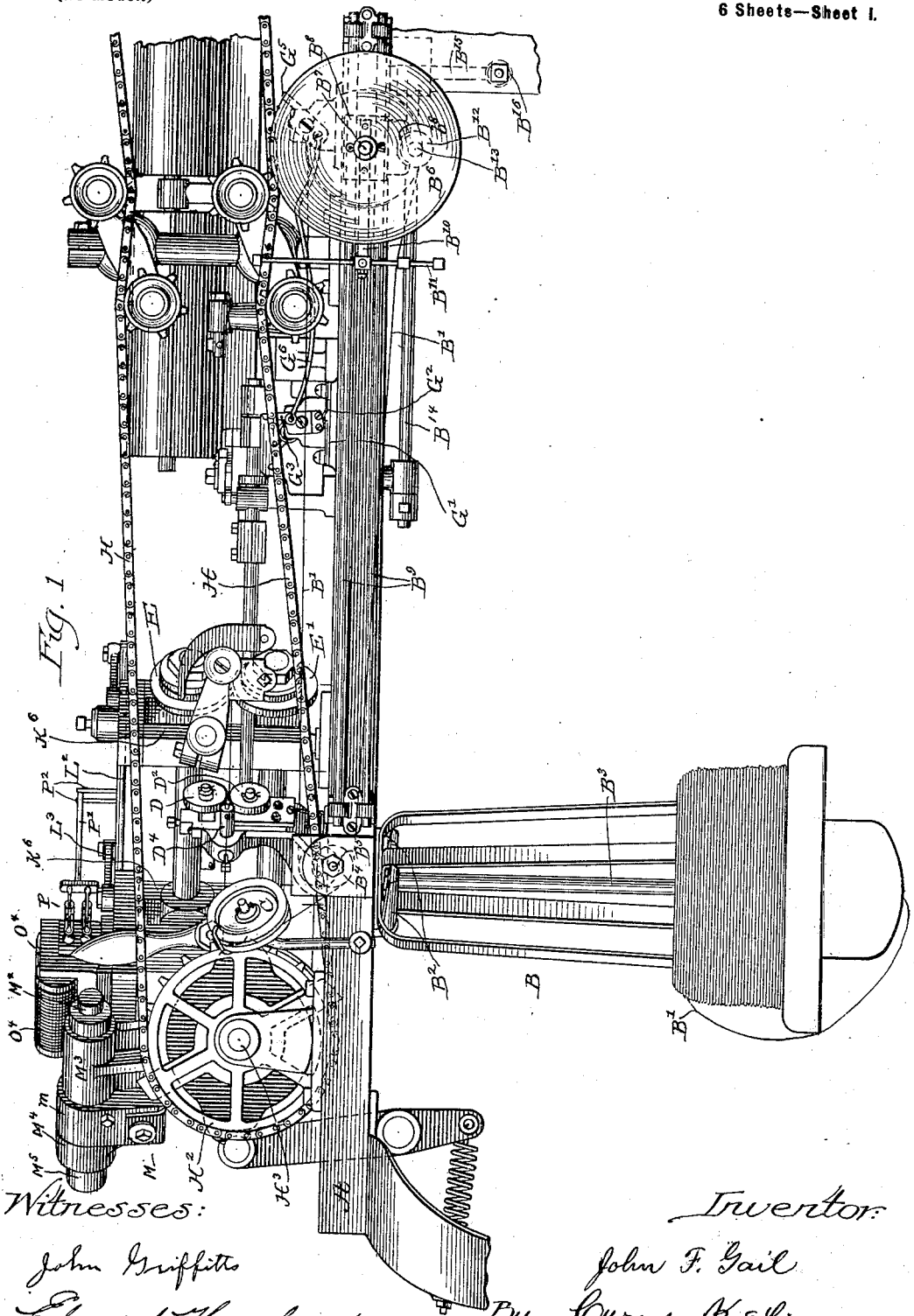

No. 688,844. Patented Dec. 17, 1901.
J. F. GAIL.
MACHINE FOR MAKING COILED WIRE FABRIC.
(Application filed Aug. 28, 1901.)
(No Model.) 6 Sheets—Sheet 1.

Witnesses:
John Griffitts
Edward Hacker

Inventor:
John F. Gail
By Cyrus Kehr
Attorney.

No. 688,844. Patented Dec. 17, 1901.
J. F. GAIL.
MACHINE FOR MAKING COILED WIRE FABRIC.
(Application filed Aug. 28, 1901.)
(No Model.) 6 Sheets—Sheet 2.
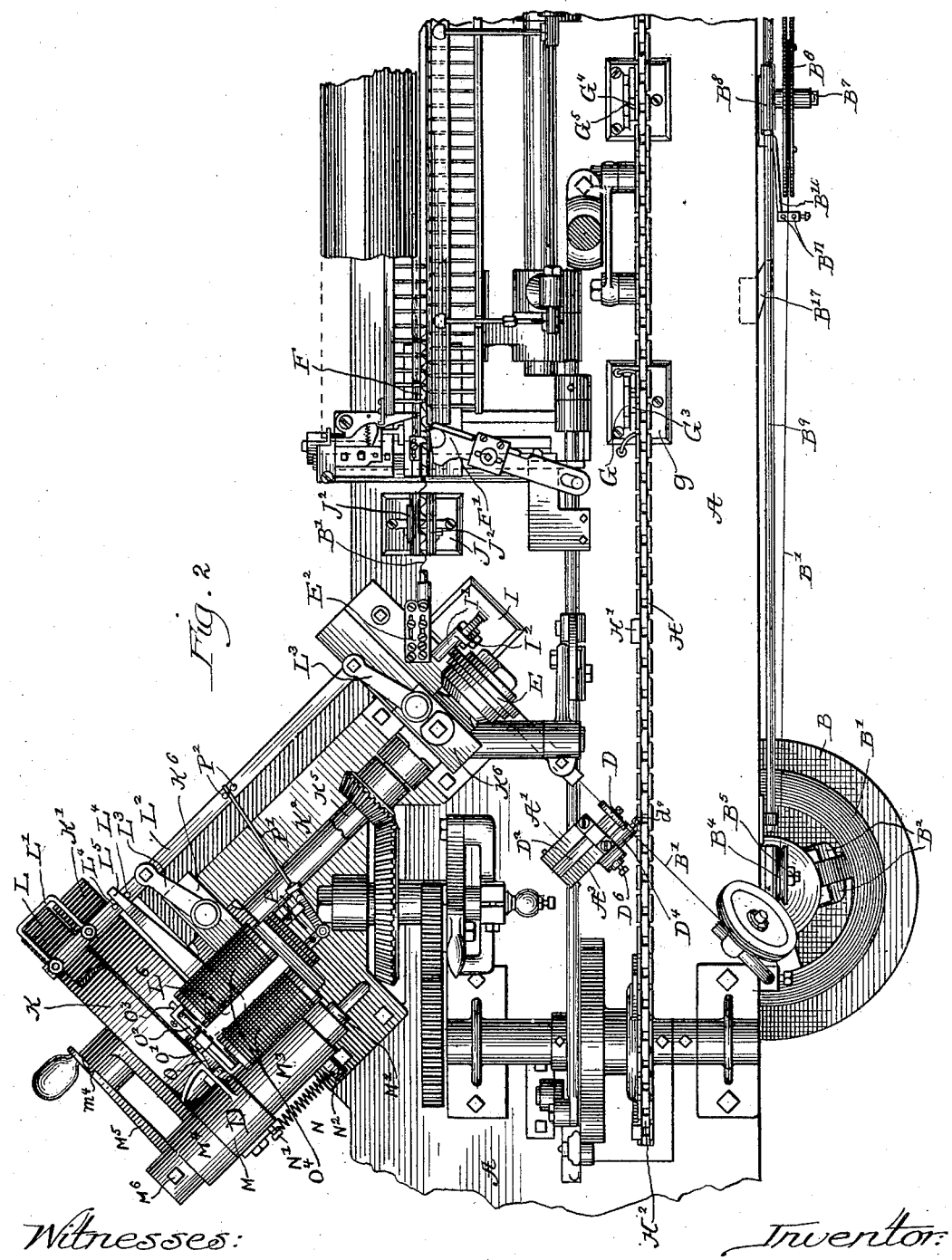

No. 688,844. Patented Dec. 17, 1901.
J. F. GAIL.
MACHINE FOR MAKING COILED WIRE FABRIC.
(Application filed Aug. 28, 1901.)
(No Model.) 6 Sheets—Sheet 3.
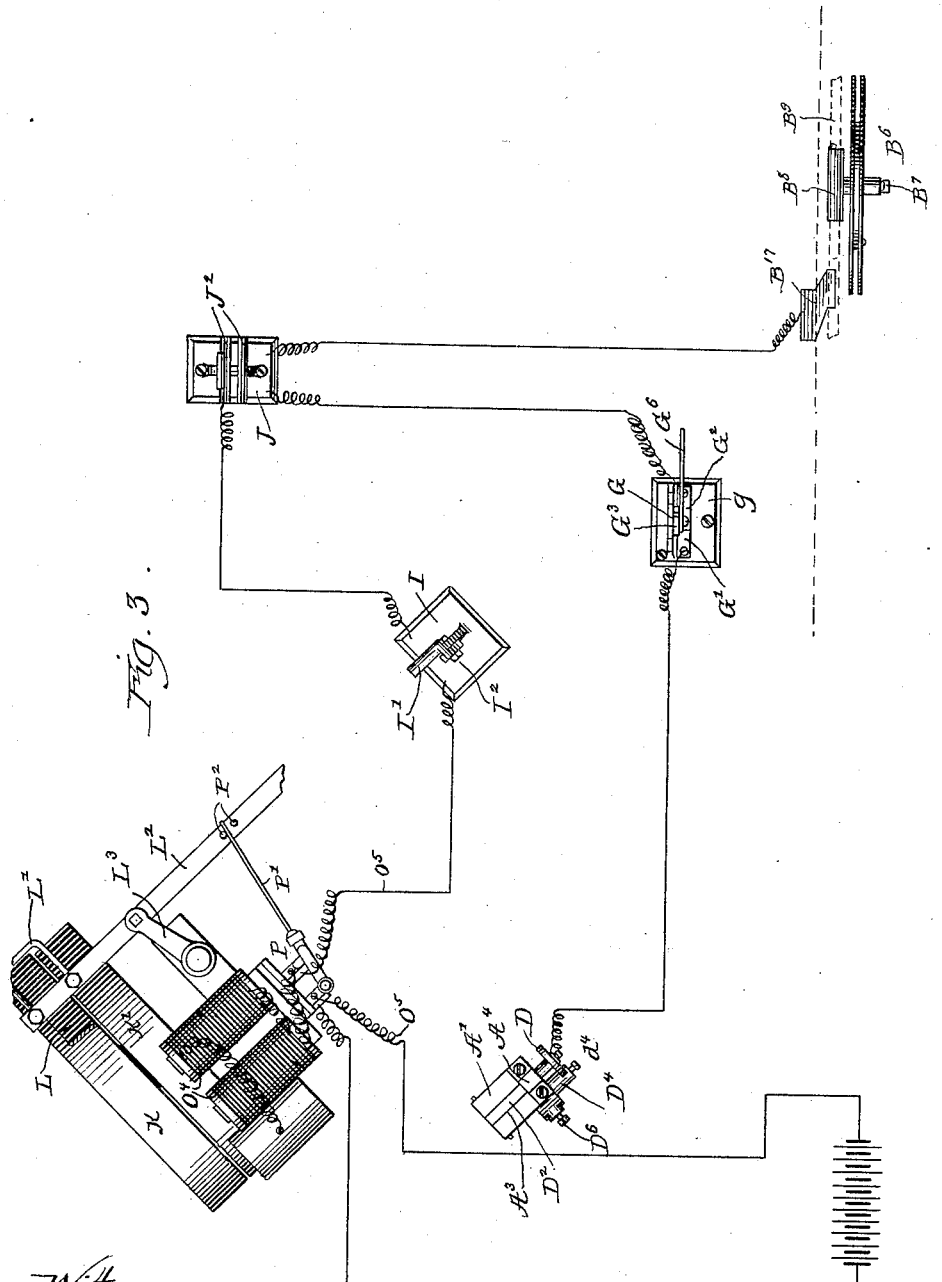
Witnesses:
John Griffitts
Edward Hacher
Inventor:
John F. Gail
By Cyrus Kehr
Attorney No. 688,844. Patented Dec. 17, 1901.
J. F. GAIL.
MACHINE FOR MAKING COILED WIRE FABRIC.
(Application filed Aug. 28, 1901.)
(No Model.) 6 Sheets—Sheet 4.
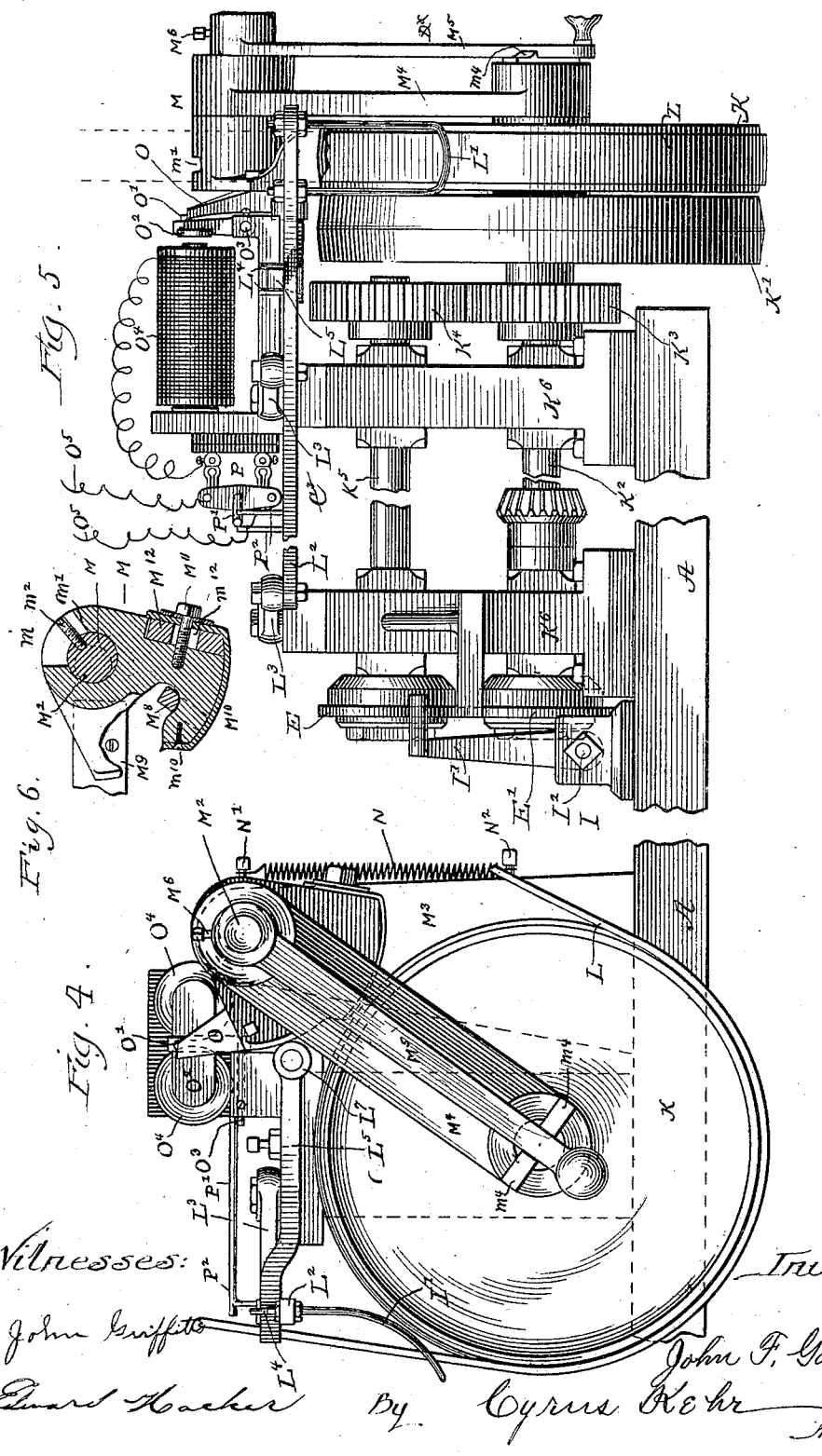

No. 688,844. Patented Dec. 17, 1901.
J. F. GAIL.
MACHINE FOR MAKING COILED WIRE FABRIC.
(Application filed Aug. 28, 1901.)
(No Model.) 6 Sheets—Sheet 5.
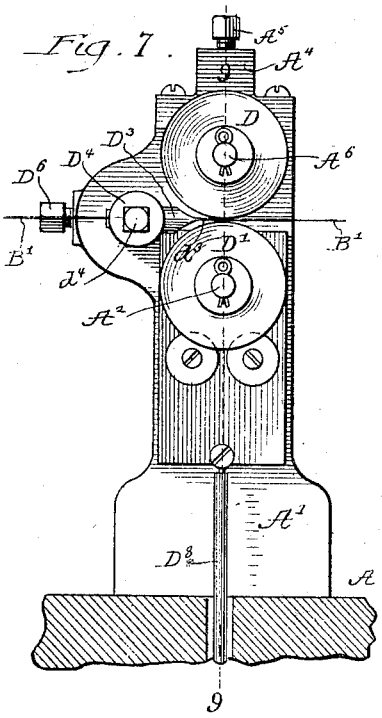
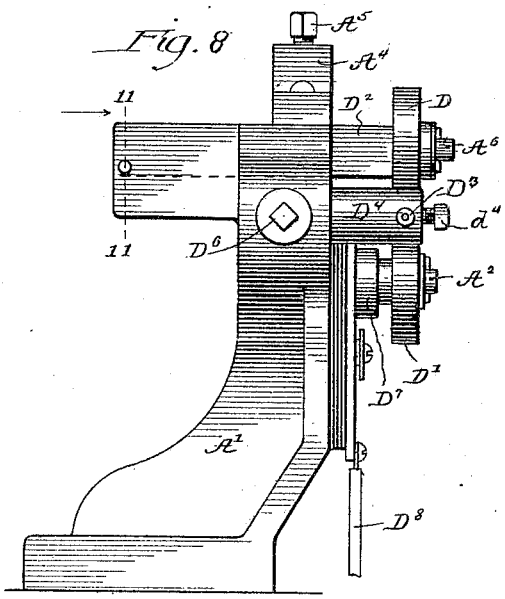
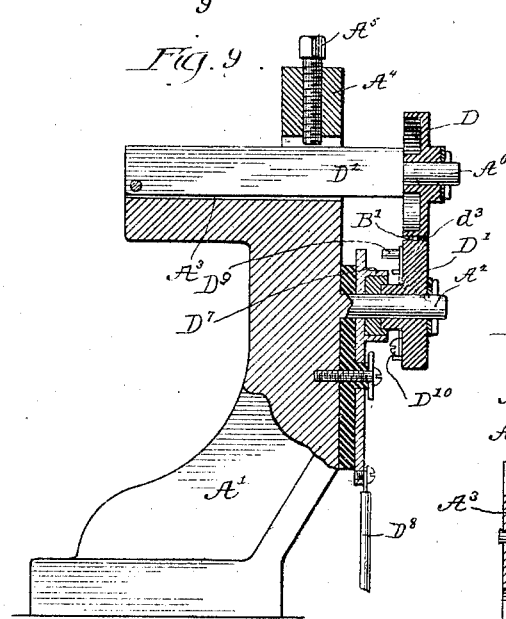
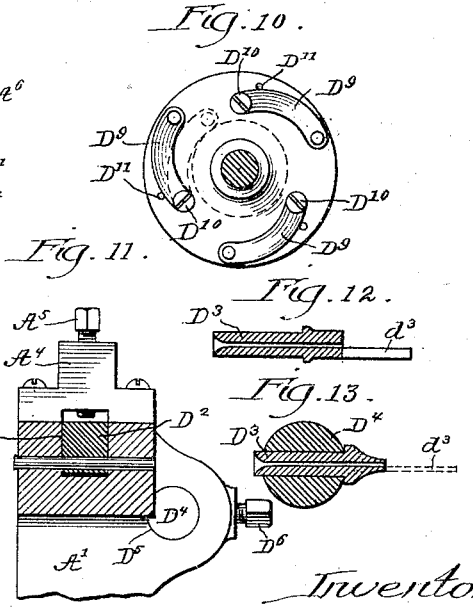
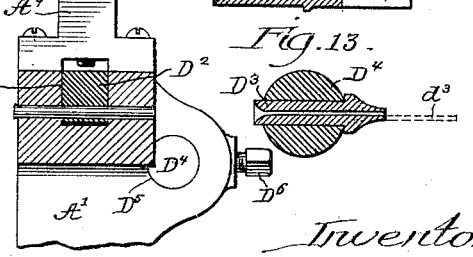
Witnesses:
John Griffitts
Edward ———
Inventor:
John F. Gail
By Cyrus Kehr
Attorney No. 688,844. Patented Dec. 17, 1901.
J. F. GAIL.
MACHINE FOR MAKING COILED WIRE FABRIC.
(Application filed Aug. 28, 1901.)
(No Model.) 6 Sheets—Sheet 6.
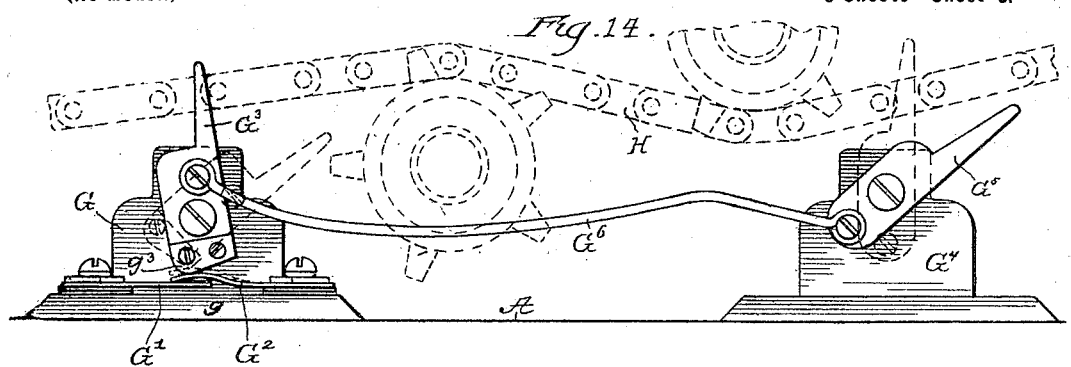
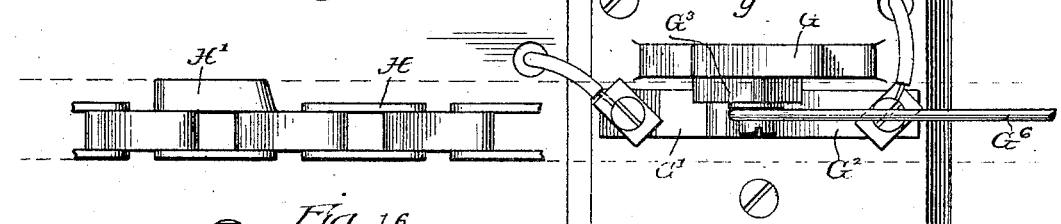
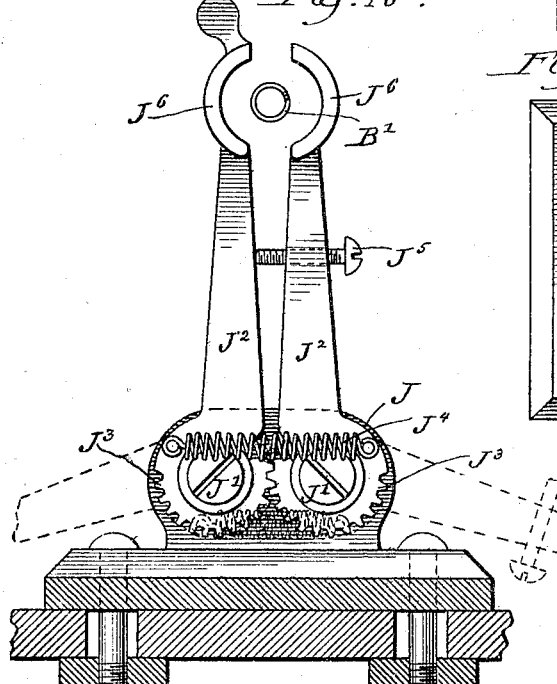
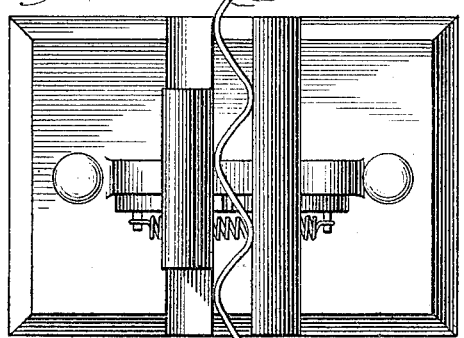
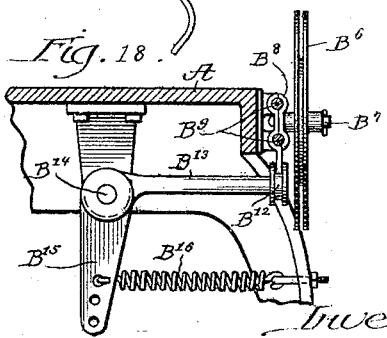

UNITED STATES PATENT OFFICE.

JOHN F. GAIL, OF KENOSHA, WISCONSIN, ASSIGNOR TO THE SIMMONS MANUFACTURING COMPANY, OF KENOSHA, WISCONSIN, A CORPORATION OF WISCONSIN.

MACHINE FOR MAKING COILED-WIRE FABRIC.

SPECIFICATION forming part of Letters Patent No. 688,844, dated December 17, 1901.

Application filed August 28, 1901. Serial No. 73,562. (No model.)

*To all whom it may concern:*

Be it known that I, JOHN F. GAIL, a citizen of the United States, residing at Kenosha, in the county of Kenosha and State of Wisconsin, have invented certain new and useful Improvements in Machines for Making Coiled-Wire Fabric; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

My invention relates particularly to machines for the manufacture of such coiled-wire fabrics as are used in the manufacture of woven-wire bed-bottoms. With such machines the coils are formed by pushing the wire through a spiral die, and the fabric is formed by rotating and progressing the new coil longitudinally, so as to cause it to intertwine at each rotation with the last preceding coil, and my invention is specially, though not exclusively, adapted to embodiment in automatic machines for the making of such fabrics.

The first and chief object of my invention is to meet the commercial demands for a more rapid machine than those heretofore in use in this art.

A second object of my invention and one that is attained incidentally with the attainment of the first is the greater uniformity in the product of the machine and the reduction of waste of wire.

A third object of my invention is the production of a machine requiring a minimum of skilled attendance.

For commercial reasons it is desirable to operate such machines at a relatively high speed. Such high speed has long been sought. This is attested by the history of experiments in various factories and by the prior patents relating to this art. Heretofore such machines have not in daily practice woven more than thirty-five fabrics of average size in a day of ten hours. With machines embodying the improvement set forth in this application and the improvements described by me in two other applications eighty such fabrics per day of ten hours have been and are being woven in daily practice and with less trouble than heretofore, and I believe that a proportionate share of said increase of production is due to the improvement herein described. The machine is now operated at a higher rate of speed and the stops due to defective operation are now less frequent and of shorter duration.

The above-mentioned objects are attained in part by improved mechanism for stopping the operation of the machine when abnormal action takes place. Said mechanism is made the subject-matter of this application. Such stopping of the machine may be divided into two factors or steps—first, the removing of the power by which the machine is driven; second, the overcoming of the momentum of the various moving parts of the machine in order that idle movement, on account of the momentum remaining after the power has been taken off, may be prevented. When the operation of the machine becomes abnormal, the prompt renewal of power and the simultaneous overcoming of the momentum of the moving parts of the machine are of great importance, for the sooner the operation is completely arrested the less wire will be wasted and the less difficult it will be to remove the wire which has been driven abnormally, and the less the fabric already made becomes disarranged or detached from the mechanism, which normally supports it and keeps the last-finished coil in the coil-receiving channel.

Power is transmitted to the machine by an ordinary belt applied to an ordinary pulley fixed upon the power-shaft. Alongside of said pulley is an ordinary idle pulley, to which the belt is shifted when the power is to be again shifted from the machine. A belt-shifter resembling the ordinary manual belt-shifter is applied to these pulleys and belt. In addition to said shifter an automatic brake is located adjacent to the power-pulley and held out of engagement with said pulley by mechanism which is released by apparatus actuated through the abnormal action of the coil or of the wire which is to form the coil.

Electric mechanism for automatically controlling said brake and belt-shifter is herein described.

Sometimes the abnormal action of the wire consists in entanglement or binding of the wire on or adjacent to the spool supplying the wire to the machine, so that the wire will not unreel or deliver at all or only under great strain. Sometimes this strain is so great as to break the wire, and sometimes it is so great as to cause the wire to slip in the coil-forming mechanism. When the latter occurs, only a partial coil will be formed by the time the cutting and fabric-shifting apparatus operate, and the part of the margin of the fabric to which said coil does not extend is then in danger of becoming detached from the fabric-holding mechanism. To stop the operation of the machine under such abnormal action, I have placed immediately following the spool a circuit-closing apparatus which is actuated by excessive tension on the wire coming from the reel; but the circuit-closing mechanism last described is not operative when the progression of the wire stops without abnormal tension. Between the last-mentioned mechanism and the forcing-rolls of the coil-forming mechanism I have located another circuit-closing mechanism, which always closes the circuit when the movement of the wire toward the coil-forming mechanism ceases or becomes abnormally slow; but during the operation of the machine there are intervals (from the completion of a coil until the cutting of said coil and the shifting of the fabric are completed) when the wire stops normally. The circuit-closing mechanism last described closes the circuit during said normal stopping of the wire as well as when the wire stops abnormally adjacent to said mechanism. To prevent the machine from being stopped during the normal stopping of the wire, I have associated with the last-mentioned circuit-closing mechanism a circuit-breaking mechanism which serves to break the circuit during the period when the last finished coil is being cut and shifted. Then the effect of said circuit-closing device is nullified by said circuit-breaking device.

Sometimes the movement of the wire from the spool to and through the forcing-rolls of the coil-forming mechanism is normal; but the wire breaks immediately after passing between said rolls, and the end of said wire instead of entering the coil-forming dies is turned laterally and "runs wild." Such abnormal action does not influence the two circuit-closing devices already mentioned. To close the circuit through such abnormal action, another circuit-closing device is placed adjacent to the coil-forming mechanism and in such position as to be reached by the loose wire running from the coil-forcing rolls. In some cases the action is abnormal after the wire issues in the form of a coil from the coil-forming mechanism and before reaching the coil-receiving mechanism or the coil-guide preceding the coil-receiving mechanism. If the resistance met by the coil in the coil-guide or the coil-receiving mechanism becomes excessive, then the coil between the coil-forming mechanism and the coil-guide bends or "buckles" laterally and ceases to pass into the coil-receiving mechanism. To aid in stopping the machine when this occurs, I have placed between the coil-forming mechanism and the coil-receiving mechanism a circuit-closing device which is actuated by the coil when the latter leaves its normal path, as above described. While the drawings show said circuit-closing devices upon the same circuit, it is to be understood that they may be placed upon separate circuits, each suitably connected with the belt-shifting mechanism.

In the accompanying drawings, Figure 1 is a front elevation of a portion of a machine embodying my improvement. Fig. 2 is a plan of the same portion of said machine. Fig. 3 is a diagram showing the electric circuit and the relative arrangement of the circuit-closing and circuit-breaking devices and the mechanism for shifting the power-belt. Fig. 4 is an end elevation of the belt-shifting and brake mechanism. Fig. 5 is an elevation of the belt-shifting and brake mechanism. Fig. 6 is a transverse section of the brake. Fig. 7 is a front elevation of the circuit-closer controlled by the movement of the wire coming to the coil-forming mechanism. Fig. 8 is a side elevation of the same. Fig. 9 is a vertical section in the line 9 9 of Fig. 7. Fig. 10 is an internal view of the lower wheel of said device. Fig. 11 is a transverse section in the line 11 11 of Fig. 8 looking in the direction of the arrow. Figs. 12 and 13 are details of the coil-guides for said device. Fig. 14 is an elevation, and Fig. 15 is a plan, illustrating mechanism for breaking the circuit when closed by said centrifugal circuit-closer during normal stopping of the wire going to the coil-forming mechanism. Fig. 16 is an elevation, and Fig. 17 a plan, of the mechanism for closing the electric circuit when the coil between the coil-forming mechanism and the coil-guide in front of the coil-receiving mechanism leaves its normal path. Figs. 18 and 19 are detail views of the circuit-closing mechanism which is actuated by excessive tension on the wire leaving the reel or spool and going toward the coil-forming mechanism.

Referring to Figs. 1 and 2, A is the frame of the machine; B is the reel holding the wire B', from which the coils are to be formed. Said reel is suspended from brackets $B^2$, extending horizontally from the frame A. The wire is led from the reel downward to the lower end of a tube $B^3$, extending vertically through said reel. The wire passes upward through said tube and extends over an idle grooved wheel $B^4$, supported on a horizontal fixed shaft $B^5$. From said wheel a wire extends to and around the friction-wheel $B^6$. Thence the wire returns to the grooved wheel B⁴ and passes over the lower portion of the latter and thence upward over an idle inclined grooved wheel C. Thence it passes between the idle rollers D D' and thence between the forcing-rolls E E'. From said forcing-rolls the wire passes through a coil-forming die E². From said coil-forming die the wire emerges as a coil and is projected forward into the coil-receiving mechanism F. It is to be remembered that all of the wire thus traced is moved by the forcing-rolls E E'. During the normal action of the machine said forcing-rolls draw the wire from the reel and force it through the coil-forming die until the coil extends through the coil-receiving mechanism to the margin of the fabric opposite the coil-forming die. Then the said forcing-rolls cease moving said wire and the knife F' severs the coil, as is well known in this art. The said forcing-rolls rotate continually during the operation of the machine; but they are separated when the movement of the wire is to cease. Said rolls may, however, be arranged to stop when their action on the wire is to stop.

The wheel B⁶ is deeply grooved in order that the wire when it becomes slack will not readily leave said groove. Said wheel is arranged to rotate upon a horizontal spindle B⁷, which is supported rigidly upon a vertical block B⁸. Said block is slidably mounted upon two parallel rods B⁹, which extend horizontally along the front edge of the frame of the machine, one of said rods being located above the other. From said block B⁸ a bracket B¹⁰ extends toward the left and supports two vertical posts B¹¹, which serve as additional guides for the wire, the latter passing between said posts. Immediately beneath the block B⁸ is a small roller B¹², the plane of which is parallel to the plane of the wheel B⁶. The axle B¹³ of said roller B¹² is extended and attached rigidly to a rock-shaft B¹⁴, suitably supported beneath the frame of the machine parallel to the rods B⁹. The arm B¹⁵ extends downward from said rock-shaft, and a contracting spring B¹⁶ is joined by one end to said arm B¹⁵ and by the other end to a relatively fixed point at the front of the machine. The tension of said spring is sufficient to hold the roller B¹² in the notch b⁸, formed in the lower edge of the block B⁸, when there is no more than normal strain upon the wire going around the friction-wheel B⁶. Should the strain upon the wire become excessive, then the wire going around the wheel B⁶ will draw toward the left so hard as to cause the block B⁸ to depress the wheel B¹² and allow said block and wheel B⁶ to slide toward the left on the rods B⁹ B⁹. This brings the base of said block into contact with an electrode B¹⁷, supported by the frame A on the electric circuit leading to the belt-shifting mechanism, whereby said circuit is closed and the brake and belt-shifting mechanism actuated for the prompt stopping of the machine.

The circuit-controlling mechanism coming next in order is that which is to be operated when the coil-forming mechanism stops or moves at less than normal speed. A standard A' rises from the frame of the machine and supports a horizontal rigid spindle A², upon which is mounted a loose roller D', the location of said roller D' being immediately beneath the path of the wire going from the wheel C to the forcing-rolls. Above the spindle A² and parallel thereto is a groove A³, and above said groove adjacent to the right-hand face of said standard is an arch A⁴, and a vertical set-screw A⁵ extends downward through said arch. A bar D² rests within said groove A³ and is suitably hinged therein at its left end, so as to permit vertical movement at the right-hand end. At the free end of said bar there is a spindle A⁶, upon which is loosely mounted the roller D, said roller D being directly above the roller D' and bearing upon the wire B', passing over the roller D'. Said set-screw is to be adjusted to limit the upward movement of said bar and to press said roller D downward to such extent as may be desired.

D³ is guide-tube for leading the wire B' to the rollers D and D'. Said tube is secured by a set-screw $d^4$ in a bracket D⁴, which extends into an opening D⁵ in the standard A'. A set-screw D⁶ extends through the standard A' to the bracket D⁴ and serves to bind said bracket in its proper position. The bracket D⁴ is cylindrical, so that said tube D³ may be adjusted by rotating said bracket upon its axis or by shifting said bracket lengthwise. Said tube D³ is preferably provided with a tongue $d^3$, extending between the rollers D and D', the vertical thickness of said tongue being slightly less than the diameter of the wire B, so that the roller D will not be in contact with said tongue when the wire B is in position between the roller D and the roller D'. When said wire is not between said rollers, the roller D will rest upon the tongue $d^3$ and prevent said roller from touching said roller D'. The tube D³ and its tongue are to be made of relatively soft metal in order to prevent wear of the wire B' and the faces of the rollers D and D', which latter are to be made of hardened steel and to be quite smooth. By preventing the contact of the rollers D with the roller D' when the wire runs out from between said rollers the grinding of the faces of said rollers is prevented, and a continued rotation of the roller D', due to the added momentum of the roller D, is prevented.

Surrounding the spindle A², between the roller D' and the standard A', is an annular electrode D⁷. Said electrode is suitably insulated from the standard A' and the spindle A² and roller D'. A circuit-wire D⁸ leads from said electrode. On the right-hand face of the roller D' are three centrifugal electrodes D⁹, which are normally held outward by centrifugal action and one of which falls upon the annular electrode D⁷ when the rotation of said roller D' is less than normal. Each electrode D⁹ is secured to said roller D' by a screw-post D¹⁰, extending loosely through one end of said electrode. The other end of said electrode is free, and its outward movement, due to centrifugal force, is limited by a post. The outer end of each electrode is turned away from the roller D' sufficiently to extend over the annular electrode D⁷, so that when said electrode D⁹ moves over the axis of the roller D it comes into contact with the outer face of said electrode. The operation of this circuit-closing device will now be readily understood. When the machine is in operation and the wire B is running at its normal velocity between the rollers D D', the rotation of the roller D' is sufficiently rapid to cause said electrodes D⁹ to turn outward on account of centrifugal action away from the axis of said roller and out of contact with the annular electrode. If the wire ceases to run or if its velocity is reduced beyond the normal, centrifugal action is reduced, so that the electrode D⁹ then uppermost will fall into contact with the annular electrode D⁷, whereby the electric circuit leading to the belt-shifting mechanism is closed; but, as already hereinbefore stated, the movement of the wire toward the coil-forming mechanism is normally interrupted at the completion of each coil. Hence the closing of the circuit by the centrifugal electrodes on the said roller D' must at such times be counteracted by a circuit-breaking mechanism suitably timed to operate during the period when the wire normally ceases to move toward the coil-forming mechanism. Such circuit-breaking mechanism is next described.

G is a standard resting upon the frame A adjacent to a sprocket-chain H.

G' is an electrode insulated upon the horizontal base $g$ of the standard G. Said electrode is preferably extended laterally from its attachment, so that said extended portion may yield vertically. G² is another electrode corresponding to the electrode G' and also insulated upon said base and extending laterally over the lateral extension of the electrode G', rising, when free, above the electrode G', so that there is no contact between them. Both said electrodes are in a circuit leading to the belt-shifting mechanism.

G³ is a lever hinged in a vertical plane to the standard G and having at its lower end an insulation $g^3$, which when said lever is in the upright position bears upon the electrode G² and presses the latter downward upon the lower electrode G', whereby the circuit is closed at this point. This is the normal position of said lever. On said sprocket-chain H is a lug or similar device H', extending laterally, so that the upper end of the lever G³ is in the path of said lug. The movement of said chain is toward the right, and when said lug meets said arm the latter is turned upon its hinge, the upper end going toward the right and the insulation $g^3$ going toward the left and upward sufficiently to allow the electrode G² to rise out of contact with the electrode G', whereby the circuit is broken at this point. The movement of said lug is so timed as to turn said lever simultaneously with the stopping of the wire when the coil has been completed, as will be hereinafter described. G⁴ is a standard similar to the standard G. It is located to the left of said standard and in the same relation to the chain H. The distance between the standard G and the standard G⁴ is equal to the distance traversed by the lug H' during the interval when the wire is not running. Attached to said standard G is a lever G⁵, similar to the lever G³, its upper end extending similarly into the path of the lug H'. From the lower end of the lever G⁵ a link G⁶ extends to the upper portion of the lever G³, each end of said link being suitably coupled to the adjacent lever at about the same distance from the axis of the adjacent lever. Being thus coupled by said link, said levers must turn upon their axes in unison when the lever G³ is upset by the passing of the lug H', and the link G⁶ is shifted toward the right and made to turn the lever G⁵ into the upright position. By the time that the lug H' has reached said lever G⁵ the electric circuit must again be closed, and said lug then upsets said lever G⁵, whereby the link G⁶ is shifted to the left and made to reset the lever G³ in the upright position, whereby the electrode G² is again pressed down upon the electrode G' and the circuit again closed.

The sprocket-chain H and its relation to the other mechanism of the machine are known in this art, and I deem it necessary to state herein only that said chain is driven by the sprocket-wheel H² on the shaft H³, Fig. 1, and that said shaft is driven continuously from the power-shaft K², which latter is driven continuously during the operation of the machine by the belt-pulley K, fixed upon said power-shaft, as will be hereinafter described.

I, Figs. 2, 3, and 5, is an insulated standard set upon the frame A of the machine between the forcing-rolls E E' and the coil-forming die E². On said standard is an arm I', reaching laterally nearly to the point where the wire issues from the forcing-rolls and enters the coil-forming die. Said standard is connected with an electric circuit leading to the belt-shifting devices, and when the wire turns laterally between the coil-forming die and the forcing-rolls by breaking or merely doubling sidewise contact is made with said arm, whereby the circuit is closed. Said arm I' is preferably hinged to said standard in any suitable manner, as by the horizontal bolt I², in order that said arm may be turned away from the forcing-rolls and the coil-forming die when the latter are to be adjusted or removed.

The fifth and last of said correcting mechanisms—the one located between the coil-forming mechanism and the coil-receiving mechanism—will be next described by reference to Figs. 2, 3, 15, and 16.

The insulated standard J is seated upon the frame A of the machine beneath the path of the coil going from the coil-forming mechanism to the coil-receiving mechanism. Upon two screw-posts J', arranged in the same horizontal plane and parallel to the course of the path of the coil and secured to said standard, are hinged two arms $J^2$, which normally extend upward at either side of the path of the coil. Said arms are preferably suitably coupled, as by gear-teeth $J^3$, so that when one of said arms is turned the other arm will be simultaneously turned in the opposite direction. A contracting coiled spring $J^4$ is joined by one end to one of said arms and by the other end to the other of said arms at points a little above the hinges of said arms when the latter are in the upright position. Thus said spring will tend to hold said arms in the upright position. If said arms are turned downward sufficiently to bring the points of attachment of said spring below the axes of said arms, the said spring will tend to draw said arms farther downward and hold them in such position. A set-screw $J^5$ extends through one of the arms $J^2$ and bears against the other of said arms and limits the approach of the upper ends of said arms of the coil. Opposite the coil-path each arm $J^2$ has a curve $J^6$, extending away from said coil-path. This form is adopted in order that the coil-path may be substantially encircled by metal, with which the coil when leaving its path may make contact. If, as already described, the coil meets resistance or leaves its path in the coil-receiving mechanism, so that it leaves its normal path between the coil-forming mechanism and the coil-receiving mechanism, contact is made with one of the arms $J^2$ and the electric circuit closed and the belt-shifting and brake mechanism instantly set into action. It is not imperative that the arms $J^2$ be hinged so as to spread and fall away from the coil-path; but it is convenient to thus turn said arms out of the way when the coil is to be entered into the coil-receiving mechanism or the coil-receiving mechanism is to be adjusted or repaired.

The belt-shifting and brake mechanism will be next described. Said mechanism is also described and claimed separately in another application executed by me of even date herewith.

K is a power-pulley.

K' is a loose or idle pulley. $K^2$ is the power-shaft. This is journaled in the columns $K^6$ $K^6$, rising from the base A. Between said loose pulley and the adjacent column $K^6$ is a spur gear-wheel $K^3$, which meshes into a corresponding gear-wheel $K^4$, seated on a shaft $K^5$, journaled in said columns parallel to said power-shaft $K^2$. At the left of the left-hand column $K^6$ said power-shaft supports a roller E', and immediately above said roller said shaft $K^5$ supports a corresponding roller E, said rollers being of proper diameter to bring their peripheries into contact and being intended to be used for driving wire into the coil-forming dies of a wire-coiling machine or for any other similar work.

L is the belt. L' is the yoke extending around the belt. $L^2$ is a horizontal bar which supports said yoke. $L^3$ $L^3$ are horizontal parallel links hinged to said bar and the columns $K^6$ $K^6$ on vertical axes, so that said bar may be shifted endwise in a horizontal plane, whereby the yoke L' is carried from one pulley to the other. As is well known, the tendency of such a pulley-belt is to remain upon the pulley to which it has been shifted, so that usually no mechanism need be employed to retain said belt in position on either of said pulleys. At the right of the right-hand column $K^6$ two pins $L^4$ stand upon the bar $L^2$. Between said pins lies one arm of a bell-crank $L^5$, which is suitably hinged at $L^6$ on a vertical axis. The other arm of said bell-crank extends horizontally to the right over the loose pulley K' and there supports an antifriction-roller $L^7$. When the brake-shoe, to be hereinafter described, goes into action, it presses against said antifriction-roller $L^7$, whereby said bell-crank is turned upon its hinge the arm lying between the pins $L^4$ $L^4$ is moved toward the left, said arm bearing against the pin $L^4$ at the left and through said pin forcing the bar $L^2$, the yoke L', and the belt L to the left, the relative lengths of the arms of the said bell-crank being such as to cause the bar $L^2$ to move just far enough to shift the belt from the pulley K to the loose pulley K'.

M is the brake. M' is the shoe of the brake. $M^2$ is a shaft extending loosely through the hub $m$ of said brake M. Said shaft is parallel to the power-shaft $K^2$ and is located above and a little to the rear of the pulleys K and K' and has one end rotatably secured in the standard $M^3$, located at the left of said brake. At the right of said brake said shaft extends through one end of the arm $M^4$, and the other end of said arm surrounds the power-shaft $K^2$. Said shaft $M^2$ extends to the right of the arm $M^4$ sufficiently to receive a crank $M^5$, which crank is rigidly secured to said shaft, as by a set-bolt $M^6$. Within the brake M the shaft $M^2$ has the eccentric portion $M^7$, the axis of such eccentric portion being at the rear of the axis of the main portion of the shaft $M^2$. The purpose of said slot and set-screw is to limit the rotation of the brake upon the shaft $M^2$, as will be readily understood by an inspection of the drawings.

E is a contracting-spring attached by its upper end to the rear portion of the brake-hub, as by means of a screw-bolt N', and by its lower end to the base of the standard $M^3$ by a screw-bolt $N^2$. The tendency of said spring is to turn the rear portion of the hub of the brake downward and to turn the brake-shoe forward and upward. The rear lower portion or heel of the brake-shoe (the working face or that which is to make contact with the periphery of the power-pulley) is eccentric (the rearmost portion being the farther from the axis of the brake) and the location of the brake is such as to bring the forward end of said working face almost into contact with the periphery of the power-pulley when the brake is in its normal position, and said eccentricity of the brake is sufficient to cause it to bind firmly upon said pulley when the brake-shoe is moved forward and upward.

The working face of the brake may be covered with any suitable material adapted to make effective engagement with the periphery of the power-pulley and which may be replaced when worn out. $M^{10}$ is a sheet of such material secured at its front end by a screw $m^{10}$ and at the rear by the screw $M^{11}$. If so desired, an adjustable block $M^{12}$, having a vertical slot $m^{12}$, through which the screw $M^{11}$ passes, may be interposed between said sheet and the brake. When the brake is to bear with greater force upon the power-pulley, said block may be set lower, or if the heel of the brake is found to extend too far on the axis of the brake said block may be moved slightly upward. Said pulley rotates in the direction of the arrow, and since it makes contact with said brake the latter is carried forward by said pulley with a force greater than could be exerted by the spring N alone, and by reason of the eccentricity of the brake said shoe becomes wedged between the periphery of said pulley and the shaft $M^2$. The forward and upward movement of said brake is limited by a lug $M^8$, located on said brake, meeting a stationary stop $M^9$, suitably secured, as upon the standard $M^3$.

The outer end of the crank $M^5$ is detachably secured in any suitable manner. The drawings show it so secured between two lugs $m^4$ $m^4$ on the portion of the arm $M^4$ adjacent to the shaft $M^2$. Said crank is sufficiently flexible to allow it to be sprung to to the right out of the space between said lugs. When said crank has been thus released, it may be turned to partially rotate the shaft $M^2$ and release the brake by moving the axis of the latter, which is the axis of the eccentric $M^7$, away from the power-pulley.

At the left-hand front portion of the brake a finger O extends upward adjacent to an armature $O^2$, which is hinged at $O^3$. From said armature a projection $O'$ extends to the right in suitable position to stand above the upper end of said finger when the brake has been turned downward and rearward out of engagement. The spring N, as already described, tends to draw said brake forward and upward. The projection $O'$ forms a stop against such forward movement, and the brake is thereby held out of engagement, notwithstanding the action of the spring N, until the engagement between the finger O and the projection $O'$ ceases. This occurs when the armature $O^2$ turns toward the left upon its hinge. A pair of electromagnets $O^4$, set at the left of said armature, shift the latter upon its hinge when the electric circuit in which said magnets are located and of which the wires $O^5$ $O^5$ form a part is closed and said magnets energized by the current then going through said circuit. When the finger O is thus released from the projection $O'$, the brake is free to rotate in response to the tension of the spring N and said brake moves forward until it makes contact with the periphery of the power-pulley, and it is then carried forward by the force of said pulley (so far as said force is transmitted to said pulley by friction) added to the force of said spring. As already described, said brake-shoe is eccentric, its heel being the farther from the axis, so that said brake becomes wedged more and more between the pulley and the shaft $M^2$ until the resistance offered by the brake becomes sufficient to stop the power-pulley or until the lug $M^8$ meets the stop $M^9$. The portion of the brake forward of said working face recedes toward the axis of the brake sufficiently to make room for the antifriction-roller $L^7$ on the bell-crank $L^5$. When the brake-shoe moves forward, said roller is pressed outward or forward by the working face of said brake-shoe, whereby said bell-crank is rotated upon its hinge and made to carry the bar $L^2$ and the yoke $L'$ and belt L to the left, said belt passing from the pulley K to the loose pulley $K'$. An attendant may apply the brake and shift the belt in the same manner by manually pushing the armature $O^2$ to the left. If it is desired to shift the belt without applying the brake, the bar $L^2$ may be shifted manually.

As already stated, the belt-shifter and brake mechanism are drawn into action when the electric circuit upon which the electromagnets are located is closed. In order that all the mechanism may be readily put back into normal position, said electric circuit should be again broken when the machine is stopped. It will be observed that it would be inconvenient to reset the brake and hold it with the armature $O^2$ without first deënergizing the electromagnets.

P is a switch or circuit-breaker located at the left of the electromagnets. Said circuit-breaker is made an automatic means for breaking the circuit after it has been closed by circuit-closing devices operating manually or automatically for the stopping of the machine. Said circuit-breaker has a handle $P'$, which extends between two pins $P^2$ $P^2$, rising from the bar $L^2$. The relative arrangement of these parts is such that when the yoke $L'$ stands in front of the power-pulley the circuit-breaker P will make contacts to close the circuit and that when the bar $L^2$ is shifted to the left to move the yoke $L'$ to the left, so as to stand in front of the loose pulley K', the hinge of such circuit-breaker will be moved to the left sufficiently to cause said circuit-breaker to break contacts.

It is to be observed that the bell-crank L⁵ is not coupled to the brake. Hence the latter may be reset independently of the belt-shifting mechanism. After the brake has been reset, the circuit reopened where it has been closed for the stopping of the machine, and the machine has been in other respects made ready for the renewal of its operation the bar L² may be manually shifted to the right, whereby the belt is again shifted to the power-pulley and the arm of the circuit-breaker is turned to the right and the circuit again closed at this point. The arm of the circuit-breaker may be sprung upward out of engagement with the bar L² and operated manually.

The electric mechanism for controlling the brake and the power-shifting mechanism may, obviously, be so modified as to keep the circuit normally closed.

I claim as my invention—

1. In a machine for making coiled-wire fabric, the combination with coil-forming mechanism and electric power-controlling mechanism, of an electric circuit communicating with said power-controlling mechanism, and a circuit-controlling device adapted to be actuated by the wire from which the coil is to be formed when said wire is under abnormal tension, substantially as described.

2. In a machine for making coiled-wire fabric, the combination with coil-forming mechanism and mechanism for applying power to said mechanism, of power-shifting mechanism, electric mechanism for controlling said shifting mechanism, an electric circuit communicating with said electric mechanism, and a circuit-controlling device adapted to be actuated by the wire from which the coil is to be formed when said wire is under abnormal tension, substantially as described.

3. In a machine for making coiled-wire fabric, the combination with coil-forming mechanism and mechanism for applying power to said mechanism, of brake mechanism, electric mechanism for controlling said brake mechanism, an electric circuit communicating with said electric mechanism, and a circuit-controlling device adapted to be actuated by the wire from which the coil is to be formed, when said wire is under abnormal tension, substantially as described.

4. In a machine for making coiled-wire fabric, the combination with coil-forming mechanism and mechanism for applying power to said mechanism, of power-shifting mechanism, electric mechanism for controlling said shifting mechanism, an electric circuit communicating with said electric mechanism, and a circuit-closing device adapted to be actuated by the wire from which the coil is to be formed when said wire is under abnormal tension, substantially as described.

5. In a machine for making coiled-wire fabric, the combination with coil-forming mechanism and mechanism for applying power to said mechanism, of power-shifting mechanism and brake mechanism, electric mechanism for controlling said power-shifting mechanism and said brake mechanism, an electric circuit communicating with said electric mechanism, and a circuit-controlling device adapted to be actuated by the wire from which the coil is to be formed when said wire is under abnormal tension, substantially as described.

6. In a machine for making coiled-wire fabric, the combination with coil-forming mechanism and mechanism for applying power to said mechanism, of power-shifting mechanism and brake mechanism, electric mechanism for controlling said power-shifting mechanism and said brake mechanism, and a circuit-closing device adapted to be actuated by the wire from which the coil is to be formed when said wire is under abnormal tension, substantially as described.

7. In a machine for making coiled-wire fabric, the combination with coil-forming mechanism and mechanism for applying power to said mechanism, of power-shifting mechanism, electric mechanism for controlling said power-shifting mechanism, an electric circuit communicating with said electric mechanism, and a shiftable guide for the wire going to the coil-forming mechanism, and a circuit-controlling device adapted to be actuated by the shifting of said shiftable guide under abnormal tension of said wire, substantially as described.

8. In a machine for making coiled-wire fabric, the combination with coil-forming mechanism and mechanism for applying power to said mechanism, of power-shifting mechanism, electric mechanism for controlling said power-shifting mechanism, an electric circuit communicating with said electric mechanism, and a shiftable guide for the wire going to the coil-forming mechanism, and a circuit-closing device adapted to be actuated by the shifting of said shiftable guide under abnormal tension of said wire, substantially as described.

9. In a machine for making coiled-wire fabric, the combination with coil-forming mechanism and mechanism for applying power to said coil-forming mechanism, of brake mechanism, electric mechanism for controlling said brake mechanism, an electric circuit communicating with said electric mechanism, and a shiftable wire-guide for the wire going to said coil-forming mechanism and adapted to be shifted by said wire when the latter is under abnormal tension, and a circuit-closing device controlling said shiftable guide, substantially as described.

10. In a machine for making coiled-wire fabric, the combination with coil-forming mechanism, and mechanism for applying power to said coil-forming mechanism, of power-shifting mechanism, electric mechanism for controlling said power-shifting mechanism, an electric circuit communicating with said electric mechanism, a shiftable wire-guide for controlling said circuit, and a yielding resistance applied to said guide and adapted to hold the latter in its normal position and to release said guide under abnormal tension to the wire going to said coil-forming mechanism, substantially as described.

11. In a machine for making coiled-wire fabric, the combination with coil-forming mechanism, of brake mechanism, electric mechanism for controlling said brake mechanism, an electric circuit communicating with said electric mechanism, a shiftable wire-guide for controlling said circuit, and a yielding resistance for holding the said wire in its normal position, substantially as described.

12. In a machine for making coiled-wire fabric, the combination with coil-forming mechanism and mechanism for applying power to said coil-forming mechanism, of power-shifting mechanism, electric mechanism for controlling said shifting mechanism, an electric circuit communicating with said electric mechanism, and a shiftable guide-wheel adapted to control said circuit, substantially as described.

13. In a machine for making coiled-wire fabric, the combination with coil-forming mechanism and mechanism for applying power to said coil-forming mechanism, of power-shifting mechanism, electric mechanism for controlling said shifting mechanism, an electric circuit communicating with said electric mechanism, a support for holding the wire to be coiled, a guide-wheel for the wire going from said support to the coil-forming mechanism and journaled upon a shiftable support, said support being held in its normal position by a yielding resistance adapted to be overcome by abnormal strain upon said wire, an electrode located in the path of said support and upon said electric circuit, substantially as described.

14. In a machine for making coiled-wire fabric, the combination with coil-forming mechanism and mechanism for applying power to said coil-forming mechanism, of power-shifting mechanism, electric mechanism for controlling said shifting mechanism, an electric circuit communicating with said electric mechanism, a support for holding the wire to be coiled, a guide-wheel for receiving the wire between said support and said coil-forming mechanism, said guide-wheel being supported upon a horizontal way and held thereon in normal position by a yielding resistance, and an electrode located adjacent to said way and upon said electric circuit, substantially as described.

15. In a machine for making coiled-wire fabric, the combination with coil-forming mechanism and mechanism for applying power to said coil-forming mechanism, of power-shifting mechanism, electric mechanism for controlling the said shifting mechanism, an electric circuit communicating with said electrical mechanism, a guide-wheel, $B^6$, for conducting the wire on its way to said coil-forming mechanism, a block, $B^8$, supporting said guide-wheel, rods, $B^9$, supporting said block, and a yielding arm for engaging said block when the latter is in its normal position and adapted to yield to break said engagement when the strain of the wire upon said wheel becomes excessive, and an electrode located adjacent to said block and upon said electric circuit, substantially as described.

16. In a machine for making coiled-wire fabric, the combination with coil-forming mechanism and power-controlling mechanism, of a centrifugal mechanism located at the side of said coil-forming mechanism from which the wire to be coiled enters said coil-forming mechanism, and adapted to be actuated by the movement of said wire, and to actuate said power-controlling mechanism when the movement of said wire is less than normal, substantially as described.

17. In a machine for making coiled-wire fabric, the combination with coil-forming mechanism and electric power-controlling mechanism, of a centrifugal circuit-controlling mechanism located at the side of said coil-forming mechanism from which the wire to be coiled enters said coil-forming mechanism, and adapted to be actuated by the movement of said wire, substantially as described.

18. In a machine for making coiled-wire fabric, the combination with coil-forming mechanism and mechanism for applying power to said coil-forming mechanism, power-shifting mechanism, a centrifugal mechanism located at the side of said coil-forming mechanism from which the wire to be coiled enters said coil-forming mechanism, said centrifugal mechanism being arranged to actuate said power-shifting mechanism when the movement of the wire toward said coil-forming mechanism ceases or becomes less than normal, substantially as described.

19. In a machine for making coiled-wire fabric, the combination with coil-forming mechanism and belt mechanism for applying power to said coil-forming mechanism, of belt-shifting mechanism, a centrifugal mechanism located at the side of said coil-forming mechanism from which the wire to be coiled enters said coil-forming mechanism, said centrifugal mechanism being arranged to actuate said belt-shifting mechanism when the movement of the wire toward said coil-forming mechanism ceases or becomes less than normal, substantially as described.

20. In a machine for making coiled-wire fabric, the combination with coil-forming mechanism, and mechanism for applying power to said coil-forming mechanism, of brake mechanism, a centrifugal mechanism located at the side of said coil-forming mechanism from which the wire to be coiled enters said coil-forming mechanism, said centrifugal mechanism being arranged to actuate said brake mechanism when the movement of the wire toward said coil-forming mechanism ceases or becomes less than normal, substantially as described.

21. In a machine for making coiled-wire fabric, the combination with coil-forming mechanism and mechanism for applying power to said coil-forming mechanism, of combined power-shifting and brake mechanism, a centrifugal mechanism located at the side of said coil-forming mechanism from which the wire to be coiled enters said coil-forming mechanism, said centrifugal mechanism being arranged to actuate said combined power-shifting and brake mechanism when the movement of the wire toward said coil-forming mechanism ceases or becomes less than normal, substantially as described.

22. In a machine for making coiled-wire fabric, the combination with coil-forming mechanism and mechanism for applying power to said coil-forming mechanism, of power-shifting mechanism, electric mechanism for controlling said shifting mechanism, an electric circuit communicating with said electric mechanism, a centrifugal mechanism located upon said circuit and receiving the wire going to said coil-forming mechanism and arranged to keep said circuit open when said wire travels at normal speed, substantially as described.

23. In a machine for making coiled-wire fabric, the combination with coil-forming mechanism and mechanism for applying power to said coil-forming mechanism, of brake mechanism, an electric mechanism for controlling said brake mechanism, an electric circuit communicating with said electric mechanism, centrifugal mechanism located upon said circuit and arranged to receive the wire going to said coil-forming mechanism and to be actuated by the movement of the latter, substantially as described.

24. In a machine for making coiled-wire fabric, the combination with coil-forming mechanism and mechanism for applying power to said coil-forming mechanism, of power-shifting mechanism and brake mechanism, an electric mechanism for controlling said brake mechanism, an electric circuit communicating with said electric mechanism, and a centrifugal circuit-controlling mechanism located upon said circuit and adapted to receive a wire going to said coil-forming mechanism and to be actuated by the movement of said wire, substantially as described.

25. In a machine for making coiled-wire fabric, the combination with coil-forming mechanism and mechanism for applying power to said coil-forming mechanism, of power-shifting mechanism, electric mechanism for controlling said shifting mechanism, an electric circuit communicating with said electric mechanism, a rotary member located adjacent to the course of the wire going to said coil-forming mechanism and adapted to be rotated by the movement of said wire, and centrifugal circuit-controlling devices supported by said rotary member, substantially as described.

26. In a machine for making coiled-wire fabric, the combination with coil-forming mechanism and mechanism for applying power to said coil-forming mechanism, of brake mechanism, electric mechanism for controlling said brake mechanism, an electric circuit communicating with said electric mechanism, a rotary member located adjacent to the course of the wire going to said coil-forming mechanism and adapted to be rotated by the movement of said wire, and centrifugal circuit-controlling devices supported by said rotary member, substantially as described.

27. In a machine for making coiled-wire fabric, the combination with coil-forming mechanism and mechanism for applying power to said coil-forming mechanism, of power-shifting mechanism and brake mechanism, electric mechanism for controlling said shifting mechanism and said brake mechanism, an electric circuit communicating with said electric mechanism, and a rotary member located adjacent to the course of the wire going to said coil-forming mechanism and adapted to be rotated by the movement of said wire, and centrifugal circuit-controlling devices supported by said rotary member, substantially as described.

28. In a machine for making coiled-wire fabric, the combination with coil-forming mechanism and mechanism for applying power to said coil-forming mechanism, of power-shifting mechanism electric mechanism for controlling said shifting mechanism, an electric circuit communicating with said electric mechanism, and a pair of rotary members between which the wire going to the coil-forming mechanism may pass, one of said members supporting centrifugal circuit-controlling mechanism connected with said circuit, substantially as described.

29. In a machine for making coiled-wire fabric, the combination with coil-forming mechanism and mechanism for applying power to said coil-forming mechanism, of power-shifting mechanism, electric mechanism for controlling said shifting mechanism, an electric circuit communicating with said electric mechanism, a rotary member located adjacent to the course of the wire to be coiled going to the said coil-forming mechanism, said rotary member being arranged in suitable relation with centrifugal circuit-controlling mechanism located upon said circuit, and a guide for conducting said wire into engagement with said rotary member whereby said wire may actuate said rotary member, substantially as described.

30. In a machine for making coiled-wire fabric, the combination with coil-forming mechanism and mechanism for applying power to said coil-forming mechanism, of power-shifting mechanism, electric mechanism for controlling said shifting mechanism, an electric circuit communicating with said electric mechanism, a rotary member located adjacent to the course of the wire going to said coil-forming mechanism, and being in suitable relation with centrifugal circuit-controlling mechanism located upon said circuit, and an adjustable guide for directing said wire into engagement with said rotary member, whereby the latter is rotated by the movement of said wire, substantially as described.

31. In a machine for making coiled-wire fabric, the combination with coil-forming mechanism and mechanism for applying power to said coil-forming mechanism, of power-shifting mechanism, electric mechanism for controlling said shifting mechanism, an electric circuit communicating with said electric mechanism, and a pair of relatively adjustable rotary members between which the wire going to the coil-forming mechanism may pass, one of said rotary members being in suitable relation with centrifugal circuit-controlling mechanism located upon said circuit, substantially as described.

32. In a machine for making coiled-wire fabric, the combination with coil-forming mechanism and mechanism for applying power to said coil-forming mechanism, of power-shifting mechanism, electric mechanism for controlling said shifting mechanism, an electric circuit communicating with said electric mechanism, two relatively adjustable rotary members between which the wire going to said coil-forming mechanism may pass, and a device extending between said rotary members and being thinner than the diameter of said wire, substantially as described.

33. In a machine for making coiled-wire fabric, the combination with coil-forming mechanism and mechanism for applying power to said coil-forming mechanism, of power-shifting mechanism, electric mechanism for controlling said shifting mechanism, an electric circuit communicating with said electric mechanism, two relatively adjustable rotary members between which the wire going to said coil-forming mechanism may pass, and a guide for conducting said wire to said rotary members and having an extension reaching between said rotary members and being thinner than the diameter of said wire, substantially as described.

34. In a machine for making coiled-wire fabric, the combination with coil-forming mechanism and mechanism for applying power to said coil-forming mechanism, of power-shifting mechanism, electric mechanism for controlling said shifting mechanism, an electric circuit communicating with said electric mechanism, a pair of rotary members adapted to receive the wire going to said coil-forming mechanism, a guide for conducting said wire to said rotary members, said guide being adjustable in a direction parallel to the axes of said rotary members and in a plane to which said axes are perpendicular, substantially as described.

35. In a machine for making coiled-wire fabric, the combination with coil-forming mechanism and mechanism for applying power to said coil-forming mechanism, of power-shifting mechanism, electric mechanism for controlling said shifting mechanism, an electric circuit communicating with said electric mechanism, a fixed axle and a hinged axle substantially parallel to said fixed axle, each of said axles supporting a wheel, one adapted to impinge upon the other, a guide for conducting the wire going to the coil-forming mechanism between said wheels, one of said wheels being in suitable relation to centrifugal circuit-controlling mechanism connected with said circuit, substantially as described.

36. In a machine for making coiled-wire fabric, the combination with coil-forming mechanism and electric power-controlling mechanism, of an electric circuit communicating with said electric mechanism, a fixed axle and a hinged axle substantially parallel to said fixed axle, each of said axles supporting a wheel, one adapted to impinge upon the other, and said hinged axle being provided with means for adjustment, a guide for conducting the wire going to the coil-forming mechanism between said wheels, one of said wheels being in suitable relation to centrifugal circuit-controlling mechanism connected with said circuit, substantially as described.

37. In a machine for making coiled-wire fabric, the combination with coil-forming mechanism and power-controlling mechanism, of a centrifugal mechanism located at the side of said coil-forming mechanism from which the wire to be coiled enters said coil-forming mechanism, and adapted to be actuated by the movement of said wire, and a second mechanism adapted to reverse the action of said centrifugal mechanism when said wire makes normal stops, substantially as described.

38. In a machine for making coiled-wire fabric, the combination with coil-forming mechanism and electric power-controlling mechanism, of a centrifugal circuit-controlling mechanism located at the side of said coil-forming mechanism from which the wire to be coiled enters said coil-forming mechanism, and adapted to be actuated by the movement of said wire, and a second circuit-controlling mechanism arranged to overcome the action of said centrifugal circuit-controlling mechanism while said wire makes normal stops, substantially as described.

39. In a machine for making coiled-wire fabric, the combination with coil-forming mechanism and electric power-controlling mechanism, of a centrifugal circuit-closing mechanism located at the side of said coil-forming mechanism from which the wire to be coiled enters said coil-forming mechanism, and adapted to be actuated by the movement of said wire, and a circuit-controlling mechanism for breaking said circuit during normal stops of said wire, substantially as described.

40. In a machine for making coiled-wire fabric, the combination with coil-forming mechanism and electric power-controlling mechism, of an electric circuit communicating with said power-controlling mechanism, means for operating said circuit when the movement of the wire going to the coil-forming mechanism becomes less than normal, and a tilting lever for opening and closing said circuit, and automatic means for shifting said lever when said wire makes normal stops, so as to overcome the action of said circuit-controlling mechanism which is actuated by the movement of said wire, substantially as described.

41. In a machine for making coiled-wire fabric, the combination with coil-forming mechanism and electric power-controlling mechanism, of a centrifugal circuit-controlling mechanism located at the side of said coil-forming mechanism from which the wire to be coiled enters said coil-forming mechanism, and adapted to be actuated by the movement of said wire, and a lever for operating two electrodes upon said circuit, a second lever, and a link joining said levers so that the latter may be moved in unison but in reversed position, and mechanism for shifting one of said levers when said wire makes a normal stop and for shifting the other of said levers when the normal movement of said wire is arrested, substantially as described.

42. In a machine for making coiled-wire fabric, the combination with coil-forming mechanism and power-controlling mechanism, of mechanism located at the side of said coil-forming mechanism from which the wire to be coiled enters said coil-forming mechanism, and mechanism adapted to be actuated by the movement of said wire for actuating said power-controlling mechanism, and a mechanism to actuate said power-controlling mechanism when the tension of said wire becomes excessive, substantially as described.

43. In a machine for making coiled-wire fabric, the combination with coil-forming mechanism and electric power-controlling mechanism, of a circuit-controlling mechanism located at the side of said coil-forming mechanism from which the wire to be coiled enters said coil-forming mechanism, and adapted to be actuated by the movement of said wire, and another circuit-controlling mechanism located adjacent to said wire and adapted to actuate said power-controlling mechanism when said wire is under abnormal tension, substantially as described.

44. In a machine for making coiled-wire fabric, the combination with power-controlling mechanism and coil-forming mechanism comprising forcing-rolls and a coil-forming die, of electric mechanism located adjacent to said forcing-rolls and said die and adapted to operate an electric circuit when the wire to be coiled issues from said forcing-rolls, without entering said die, substantially as described.

45. In a machine for making coiled-wire fabric, the combination with electric power-controlling mechanism, and coil-forming mechanism comprising forcing-rolls and a coil-forming die, of an electrode located adjacent to said rolls and said die and adapted to complete an electric circuit when the wire to be coiled leaves said rolls, without entering said die, and touches said electrode, substantially as described.

46. In a machine for making coiled-wire fabric, the combination with electric power-controlling mechanism, and coil-forming mechanism comprising forcing-rolls and a coil-forming die, of a hinged electrode located adjacent to said rolls and said die and adapted to complete an electric circuit when the wire to be coiled leaves said rolls, without entering said die, and touches said electrode, substantially as described.

47. In a machine for making coiled-wire fabric, the combination with electric power-controlling mechanism and coil-forming mechanism and coil-receiving mechanism, of a circuit-controlling mechanism located between said coil-forming mechanism and said coil-receiving mechanism and adapted to be actuated by the lateral movement of the coil going from said coil-forming mechanism to said coil-receiving mechanism, substantially as described.

48. In a machine for making coiled-wire fabric, the combination with electric power-controlling mechanism and coil-forming mechanism and coil-receiving mechanism, of circuit-controlling mechanism located between said coil-forming mechanism and said coil-receiving mechanism and consisting of a pair of hinged arms extending adjacent to the path of the coil, substantially as described.

49. In a machine for making coiled-wire fabric, the combination with electric power-controlling mechanism and coil-forming mechanism and coil-receiving mechanism, of circuit-controlling mechanism located between said coil-forming mechanism and said coil-receiving mechanism and consisting of a pair of hinged arms standing normally adjacent to the path of the coil, and a spring for holding said arms in said position, substantially as described.

50. In a machine for making coiled-wire fabric, the combination with electric power-controlling mechanism and coil-forming mechanism and coil-receiving mechanism, of circuit-controlling mechanism located between said coil-forming mechanism and said coil-receiving mechanism and consisting of a pair of arms standing at opposite sides of the path of the coil and suitably hinged and coupled to adapt them to move in unison away from the path of said coil, substantially as described.

In testimony whereof I affix my signature, in presence of two witnesses, this 7th day of August, in the year 1901.

JOHN F. GAIL.

Witnesses:
CHAS. VOIGHT,
RAY SWIFT.